United States Patent
Katzer et al.

(10) Patent No.: US 9,691,182 B1
(45) Date of Patent: Jun. 27, 2017

(54) SYSTEM AND METHOD FOR ADAPTIVE DISPLAY RESTRICTION IN A HEADSET COMPUTER

(71) Applicant: Sprint Communications Company L.P., Overland Park, KS (US)

(72) Inventors: Robin D. Katzer, Louisburg, KS (US); Hemant V. Tiwari, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 286 days.

(21) Appl. No.: 14/504,417

(22) Filed: Oct. 1, 2014

(51) Int. Cl.
  *G06T 19/00* (2011.01)
  *G02B 27/01* (2006.01)
  *B60R 1/00* (2006.01)

(52) U.S. Cl.
  CPC .............. *G06T 19/006* (2013.01); *B60R 1/00* (2013.01); *G02B 27/017* (2013.01); *B60R 2300/205* (2013.01); *G02B 2027/0178* (2013.01)

(58) Field of Classification Search
  CPC ................. G06T 19/006; G06T 19/003; B60R 2300/205; B60R 1/00; G02B 2027/0178
  USPC ........................................................ 345/633
  See application file for complete search history.

(56) References Cited

U.S. PATENT DOCUMENTS

| 7,940,285 | B2 * | 5/2011 | Would | G06F 3/0482 345/629 |
| 2012/0218172 | A1 * | 8/2012 | Border | G02B 27/0093 345/8 |
| 2013/0249947 | A1 * | 9/2013 | Reitan | G06F 3/011 345/633 |
| 2015/0379777 | A1 * | 12/2015 | Sasaki | A63F 13/211 345/633 |

OTHER PUBLICATIONS

Narzt et al., Augmented reality navigation systems, Univ Access Inf Soc Dec. 21, 2005, 4: 177-187.*

* cited by examiner

*Primary Examiner* — Robert Craddock (57) ABSTRACT

An apparatus for improving the safety of a driver while driving a car, the apparatus comprising a headset for combining an unobstructed view with a virtual overlay, the virtual overlay created from a virtual output provided to the headset, the virtual output having one or more portions, a memory, a processor, at least one input device coupled to the memory and capable of delivering input device data to the memory, an application stored in the memory that when executed by the processor determines characteristics of the driver or an environment around the driver based upon data from the at least one input device, and a controller that based on the determined characteristics performs one or more of the following: block a portion of the virtual output to the virtual overlay, alters at least a portion of the virtual output to the virtual overlay, or adds a new portion to the virtual output.

19 Claims, 7 Drawing Sheets

SYSTEM AND METHOD FOR ADAPTIVE DISPLAY RESTRICTION IN A HEADSET COMPUTER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

One of the new and popular devices for viewing output from a computer or smart phone is a headset for a person to wear. The headset may include a transparent screen or sheet for the person wearing the headset to look through. The transparent screen comprises a transparent material that may be glass, plexiglass, polycarbonate, or some other transparent material. This material will be referred to herein as glass, though it is understood that any transparent material may be used. In some applications, glass may be dangerous or a hazard to eye safety and thus glass material may be avoided in those applications. The literature that has developed around such headsets with transparent screens, however, often refers to such transparent screens as "glass," even though non-glass materials may be used in making the screen, and the present disclosure will conform to that language usage. The glass may also serve as a screen on which to project a virtual overlay. The virtual overlay may be generated by a computer or other digital device. The overlay may augment reality, or it may simply be other digital content. In some cases, a computer or smart phone may be integrated into the headset or glasses. Alternatively, the computer or smart phone may be affixed or adhered to the glasses. The computer or smart phone may also be completely separate. The virtual overlay content may instead be projected on the windshield of a car.

SUMMARY

In an embodiment, an apparatus is disclosed for improving the safety of a driver while driving a car, the apparatus comprising a headset for combining an unobstructed view with a virtual overlay, the virtual overlay created from a virtual output provided to the headset, the virtual output having one or more portions, a memory, a processor, at least one input device coupled to the memory and capable of delivering input device data to the memory, an application stored in the memory that when executed by the processor determines characteristics of the driver or an environment around the driver based upon data from the at least one input device, and a controller that based on the determined characteristics performs one or more of the following: block a portion of the virtual output to the virtual overlay, alters at least a portion of the virtual output to the virtual overlay, or adds a new portion to the virtual output.

In another embodiment, an apparatus is disclosed comprising a headset for combining an unobstructed view with a virtual overlay occluding a portion of the view, the apparatus comprising a car on/off software component using inputs to determine if a car is running, the car comprising a driver's seat, a wearer's position software component using inputs to determine if a person wearing the headset is sitting in the driver's seat, a controlling software component analyzing all active programs providing inputs to the overlay and/or analyzing the inputs to the virtual overlay and being able to at least allow or alter a virtual output to the headset to be shown on the virtual overlay, and wherein, if the car on/off software component determines that the car is running, and the wearer's position software component determines that the person is wearing the headset and sitting in the driver's seat, then the controlling software component controls the virtual output by performing one or more of the following: blocking at least a portion of the virtual output to the virtual overlay unchanged, altering at least a portion of the virtual output to the virtual overlay, or adding a new portion to the virtual output.

In another embodiment, an apparatus is disclosed for improving the safety of a driver while driving a car, apparatus comprising a windshield for the car, the windshield capable of combining an unobstructed view with a virtual overlay occluding a portion of the view, the virtual overlay created from a virtual output provided to the windshield, the virtual output having one or more portions, a memory, a processor, at least one input device coupled to the memory and capable of delivering input device data to the memory, an application stored in the memory that when executed by the processor determines characteristics of the driver and/or an environment around the driver based upon data from the at least one input device, and a controller that based on the determined characteristics performs one or more of the following: blocks at least a portion of the virtual output to the virtual overlay unchanged, alters at least a portion of the virtual output to the virtual overlay, or adds a new portion to the virtual output.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

While headsets that provide visual digital content as an overlay on clear glass are becoming popular, these headsets can be distracting if worn by the driver of a car, and put the driver at more risk of being involved with or causing an accident. In some jurisdictions, laws are being put in place to outlaw the use of these headsets while driving. However, instead of completely shutting off all output to the headset, it may be possible to selectively cut off, alter, or begin various outputs to the virtual overlay, to thereby make the driving safer while visual digital output is presented on the headset. The decision of which output to allow, which to cut off, which to start, and which to allow but alter, may be determined based on various inputs to a processor, those inputs leading to decisions about which outputs and in what form to allow to go to the virtual overlay of the headset. Thereby, the headset can still be worn in a safe manner while driving, and may even enhance the safety of the driver. This improved process for deciding what to show as a virtual overlay on a headset may also work with output virtually overlaid onto a windshield.

Helping to make a safer experience while wearing the headset would be such parameters as: restrictions to watching only certain types of output (i.e., maps OK, movies not); limitations on how much of the field of vision can be occluded; and, limitations on transparency of the display. The visual digital output may also vary depending on a number of factors. One way the output may vary is based on how bright the view through the glass is. That is, perhaps a brighter display would be preferable in daylight, and a dimmed display at night. Or perhaps a display that brightens rapidly when the view darkens, such as when the driver pulls into a parking garage or a tunnel. Or the output may be alterable based on motion, being brighter and filling more of the field of vision when the car is at rest, and then dimming and taking up less of the field of vision when the car is in motion. The output may vary based on the situation. For instance, if there are a lot of other vehicles close by and in motion, the output will be dimmed and reduced in area, as compared to being brighter and filling more of the display when the driver and his vehicle are far from other vehicles.

The headset or accompanying hardware may include various inputs, to provide needed information to decide what to allow and what not to allow. For instance, ambient brightness, g-loads, radar, and movement may all be tracked by the headset itself or possibly a separate device or subsystems of the vehicle.

All of the rules regarding the headsets could be controlled by a controller program. The controller program may be created by a vendor, who obtains federal and state approval for its version. The controller program may include specific subsets of rules for various jurisdictions. For instance, different overlays of rules for federal, state, county or city requirements. The controller program may preferably include a GPS input so that it may apply the appropriate overlays of rule sets for the location the vehicle is in. These rules may have restrictions (i.e., no movies), or they may have requirements (i.e., following too close warning light), or both. There may also be a certain amount of selectability of content that the driver may choose from. For instance, there may be four different set screens of information through which the driver may select as they please.

Driving could be made safer by providing the driver with useful information at a focal plane and line of vision that is very close to the view watching the road ahead. Thereby, instead of having to look down or sideways at gauges or displays that are at a different focal plane, and thus forcing the eyes to focus in and out while not looking at the road ahead, the driver can readily keep their eyes and focus where needed. Various warnings could also pop up into the immediate field of vision to improve safety. The controller program may preferably be able to determine whether the wearer of the headset is in fact driving the vehicle, thereby activating the controls of the controlling program.

Figure 1:
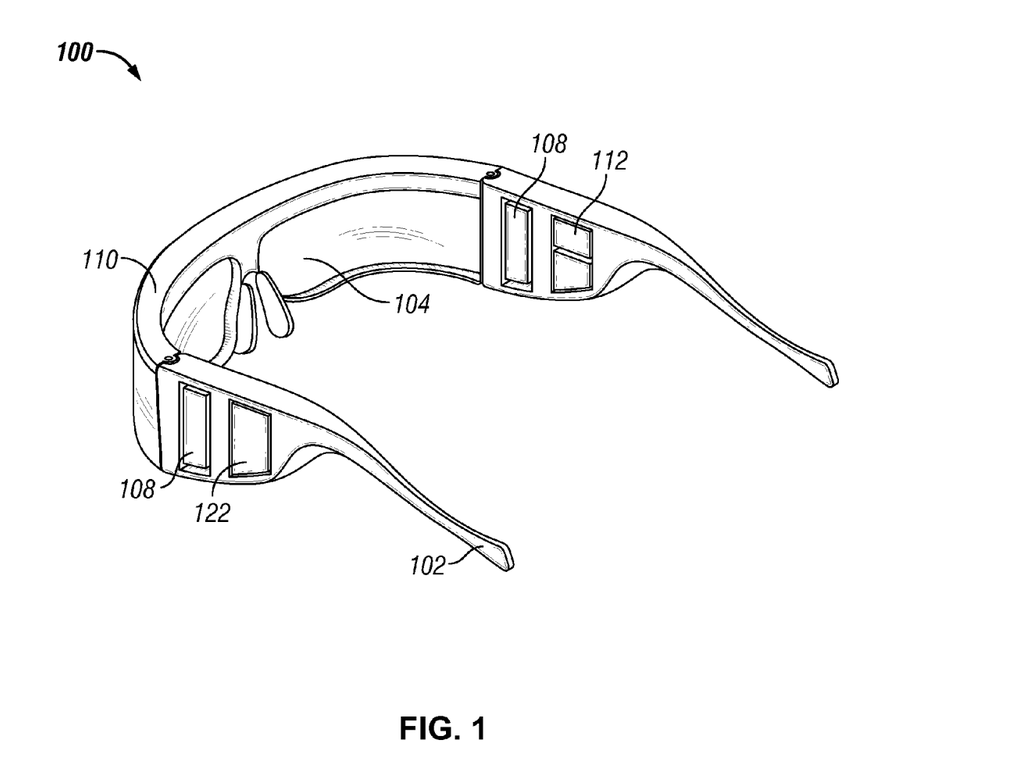
FIG. 1 is an illustration of an apparatus according to an embodiment of the disclosure.

Referring now to FIG. 1, an embodiment of the headset 100 is shown. The headset 100 comprises head restraint components 102, glass panels 104, video projectors 108, glass holders 110, headset connector 112 and connector cover 122. The connector 112 in this particular embodiment is shown as being a wireless connection device, using for instance Bluetooth or WiFi. A digital visual output is transmitted from an external source, such as a computer or smart phone, to the connector 112, and from there to the video projectors 108. The video projectors 108 project the digital virtual output onto the glass panels 104. Thereby, a person wearing the headset 100 will be able to see the digital visual output as a virtual overlay at least partially occluding the unobstructed field of vision through the glass panels. The glass panels 104 comprise a transparent material that may be glass, plexiglass, polycarbonate, or some other transparent material. This material will be referred to herein as glass, as is customary in the current technical literature, though it is understood that a variety of non-glass transparent materials may be used instead of glass.

While this particular headset 100 is shown for illustration purposes, it is understood that any number of variations to the headset 100 can be made and still be within the concept of the invention. For instance, while in the illustrated embodiment the memory and processor are external to the headset 100, they could also be integrated into the headset, either as a computer or as a smart phone built into the headset 100. In this case, the headset 100 may be referred to as a headset computer and/or as a wearable computer. Also, the glass panels 104 may not cover the entire field of vision, but only cover a portion of the field of vision. Further, there may be only one glass panel 104, positioned in front of one or both eyes of the wearer. There may also only be one video projector 108. The headset 100 may be held in place by any number of alternative methods, including an elastic strap, being built-in as part of a helmet, etc. Also, while shown here as being a wireless connector, a wired connection may be used.

Figure 2:
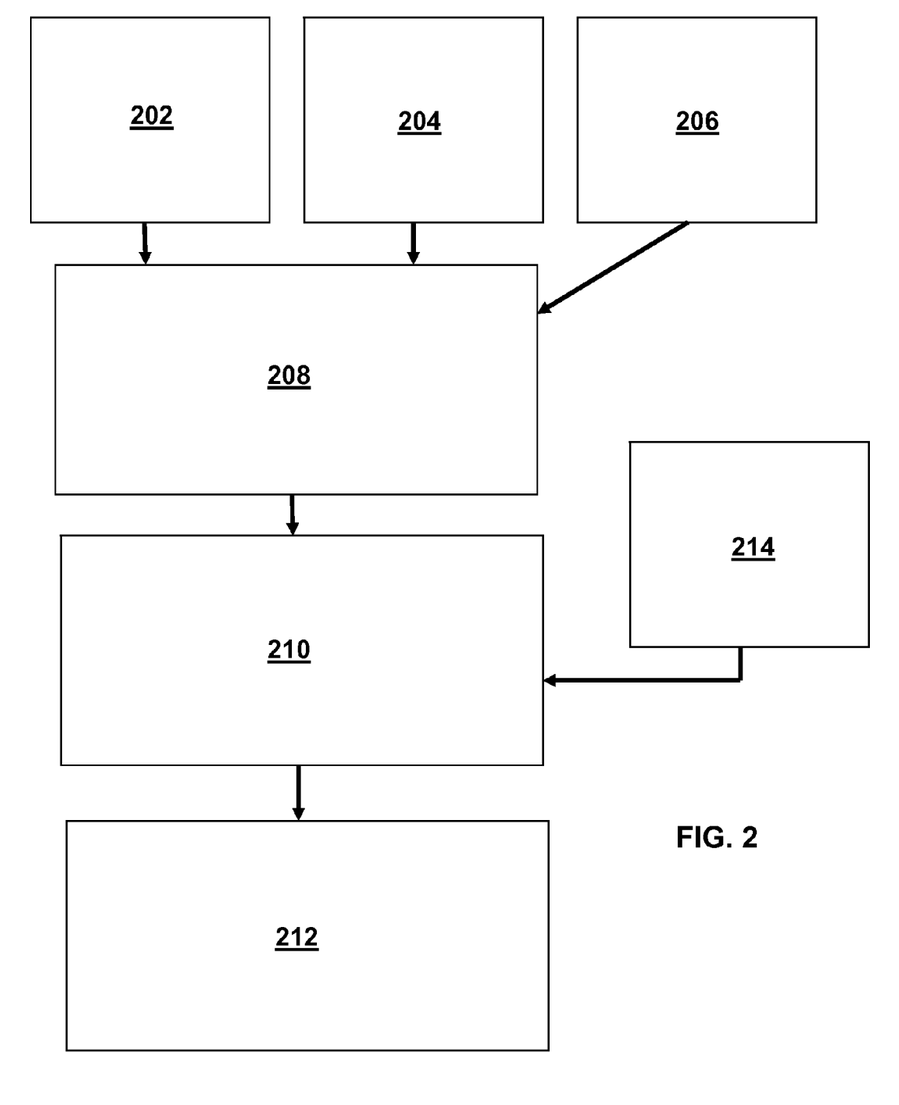
FIG. 2 is a schematic illustrating an apparatus according to an embodiment of the disclosure.

Referring now to FIG. 2, a schematic diagram of the system 200 of an embodiment is shown. Sources 202, 204 and 206 all input data to memory 208. Source 202 may be the headset, which may be equipped with various input devices, such as a camera (which could measure ambient brightness), a microphone, an accelerometer, a tilt-meter, a GPS, or other input-data creating devices. Source 204 may be from the car itself. This can include whatever data the car's computer has accessible, including such data as speed, g-forces, radar input of area around the car, GPS location, RPMs, running/not running condition, etc. Source 206 may be from another external source, such as a smart phone or a computer. The external source 206 can potentially provide data such as location, speed, mapping information, or other data from a source remote from the glasses and the external device, such data being brought in via WiFi, Bluetooth, wireless networks, etc. While shown here with multiple sources of inputs, the system 200 may only have one of these sources for input, or perhaps only two of them. Various data may come from several of the inputs. For example, the car, the headset and the external source may all be able to provide g-load or GPS data. Any of these sources may also be coupled to more extended sources, via Bluetooth, WiFi, wireless networks, hardwiring, etc., to access additional data, e.g., map data.

Data may be input into the memory 208. A controller program may be running on the processor 210 that can selectively pull data from the memory 208. Wherever the controlling program is running, that device becomes the controller of the output to the display. Various applications 214 also may execute on the processor 210. The controller program makes various decisions and uses those decisions to control the output to the headset 212, specifically deciding which of the applications 214 to allow to run, in either an altered or unaltered state. While the system 200 is shown including a memory 208, it may also leave out the memory 208 and have the input data from sources 202, 204 and 206 feed into the processor 210 for computing and decision-making. Alternatively, the memory may be integral with the processor 210. Further, while shown here with the applications 214 being fed into the same processor 210 being used by the controller program, in another embodiment the applications 214 could be running on their own system, and just the virtual output portion of the applications 214 going to the processor 210 for the controller program to make decisions about. Thereby, the controller may be a separate hardware component, and the applications may have all their own sensors, etc.

The controller program may take into consideration the data from the inputs, and possibly requests of the driver as well as a series of jurisdictional or its own requirements and restrictions. So, the output to the display can vary based on a range of possibilities. For instance, if the ambient lighting is bright, the display may be brightened to allow being more visible. If the driver wishes to see a map of a preferred route to a location, that may become the primary element of the display. If federal regulators require at least four optional screens with relevant data they consider useful, with a maximum coverage of 20% of the field of vision and a transparency of at least 50%, that could be built into the controller program as well. The transparency, or line thickness, may vary for different situations. Perhaps there will be limits on brightness as compared to ambient lighting.

Indeed, the controller program could be dynamic, allowing it to constantly change what is required, what is restricted, and what is optional, based on various inputs. In a simple form, it could merely have a list of allowable applications that can be running when the car is in motion. But more likely, there may be federal, state, county and city regulations regarding required, restricted or optional output to the headset. And all these may differ to some degree. The headset will need to constantly track its location so that it may operate in keeping with all the various overlaying regulations. Or, the driver may or may not wish to see a map to guide him to a location. That is, perhaps a brighter display would be preferable in daylight, and a dimmed display at night. Or perhaps a display that brightens rapidly when the view darkens, such as when the driver pulls into a parking garage or a tunnel. Or the output may be alterable based on motion, being brighter and filling more of the field of vision when the car is at rest, and then dimming and taking up less of the field of vision when the car is in motion. The output may vary based on the situation. For instance, if there are a lot of other vehicles close by and in motion, the output will be dimmed and reduced in area, as compared to being brighter and filling more of the display when the driver and his vehicle are far from other vehicles.

So, the controller program may serve as the gate-keeper, deciding what portion of the various inputs and programs will be allowed to provide virtual output to the headset. Accordingly, it is preferable that the controller program may be designed to be active at all times. Thereby, it may be active when a driver gets into a car. Or the controller program may run at a reduced level most of the time, seeking only to determine if the wearer of the headset is positioned in the driver's seat of a car, and not activating its controlling features until such a condition arises. Further, the controller program may decide to activate based on whether the car is in motion or at rest, or possibly based on whether the car is running or not, or whether or not the car is in Park or Neutral.

Another possible decision the controller program may make is to alter some portion of the virtual output to the virtual overlay. For example, the controller program may cause a portion of the virtual overlay to reduce in size, or change location, so as not to be in the direct line of sight of the driver. The virtual overlay may for example be moved to the bottom edge of the glass, or the top edge. The controller program may also cause a portion of the virtual overlay to become partially transparent, perhaps by removing some percentage of the lines from the virtual overlay. The controller program may also alter the brightness of a portion of the virtual overlay, based on the ambient lighting, to make the content less distracting. If the headset includes a forward-facing camera, the information obtainable from the camera could be used to determine a preferred location on the virtual overlay to show the virtual output so as to minimize the blocking of key portions of the driver's view forward. For instance, using a portion of the view that is looking at the headliner of the car, or down towards the hood. Some examples of virtual output that the controller program would allow to go to the virtual overlay could include navigation applications and traffic applications.

Another possible decision the controller program may make is to start an application to become a portion of new virtual output to go to the virtual overlay. Such applications could be designed to be complementary to focus on driving. Examples of such applications could be applications designed to provide compass information, or to interface with the car's computer and provide relevant information such as speed, RPM, g-loads, back-up camera output, signals from warning sensors, etc. In vehicles with poor rear visibility from the driver's seat, the virtual overlay could include content from a wide-angle rear facing camera. Another example of a driving application would be one that tracks eye movement and head position, and can determine when a driver is starting to get drowsy, and pop up a bright sudden message to inform the driver of his condition, and suggest courses of action, such as "You should find a safe place to stop and take a rest break." Such applications may be required, or may be optional.

Another application could be for beginning drivers. It is possible to track eye movement with appropriate cameras. One of the biggest challenges for beginning drivers is to learn to move their eyes from the road ahead to the mirrors, and from there to the dash, and from there back to the road ahead, at a pace that is best for safety. To aid in learning this skill, an application may be provided that is started when the driver sits in a driver's seat of a car, the application tracking eye movement, comparing the actual eye movement rates and time in various positions with a database of preferred numbers, and providing virtual output to the virtual overlay to encourage better performance. For instance, the virtual overlay may show a suggestion to "Be sure to look at the right hand rear-view mirror too!", or "Let your eyes move around a bit more, don't stare straight ahead so much." Thereby, the use of the headset would actually make the beginning driver safer. Even for experienced drivers, such an application could be beneficial. Indeed, such an application could be required in some jurisdictions for some drivers, such as those under 18.

Figure 3:
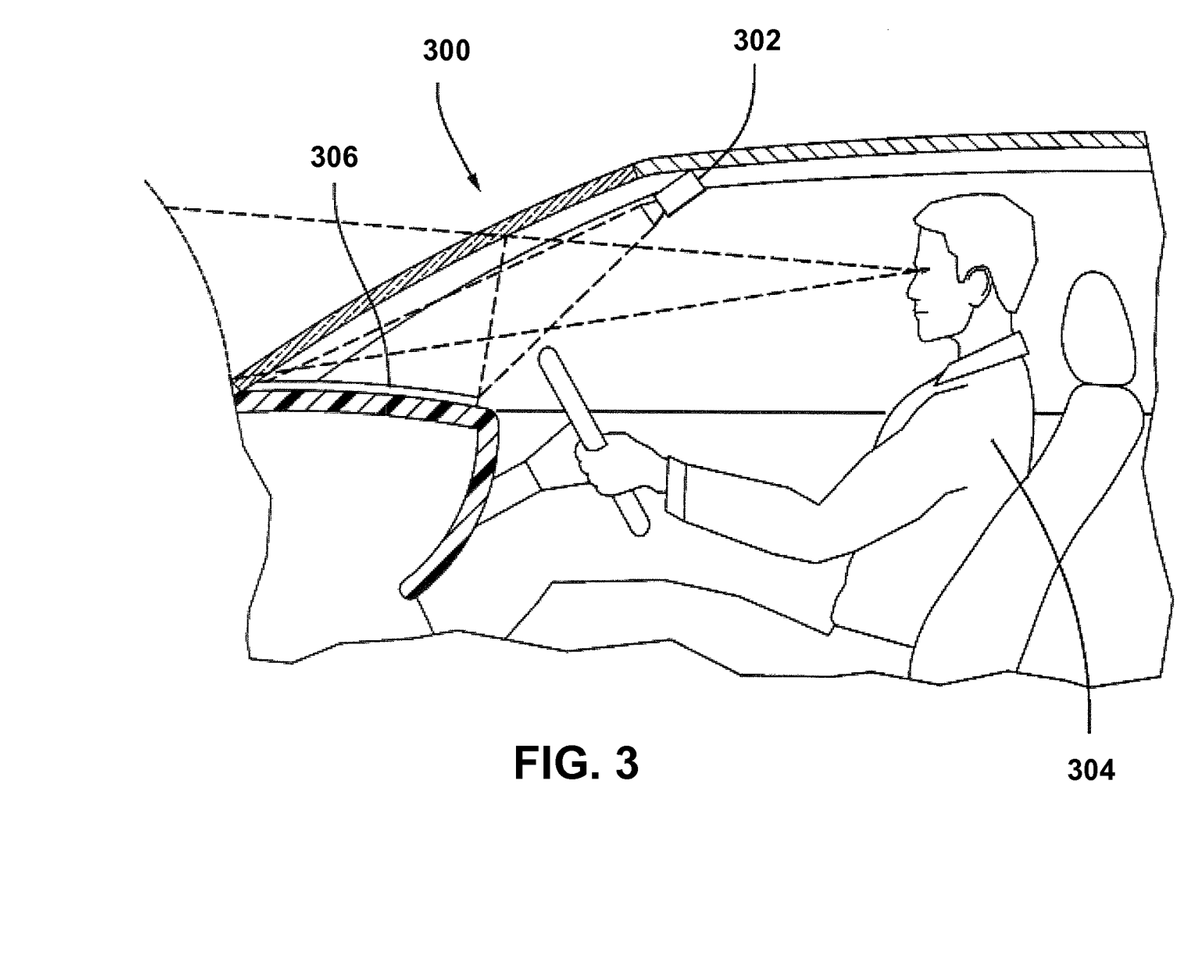
FIG. 3 is a schematic illustrating another method according to an embodiment of the disclosure.

Referring now to FIG. 3, an embodiment is shown that replaces the glass of the headset with the windshield of the car. Specifically, a windshield 300 received virtual output from a projector 302 that is reflected off a reflector 306. Thereby, a driver 304 is able to see the virtual output as a virtual overlay on the windshield 300 without the need to wear a headset. This system could be used with all the various embodiments disclosed herein.

Figure 4:
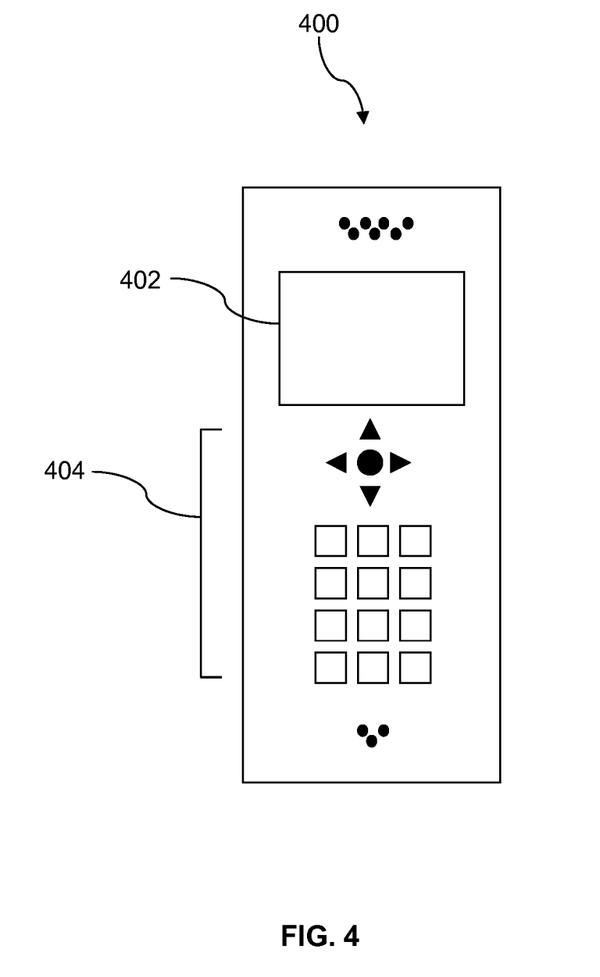
FIG. 4 is an illustration of a mobile communication device according to an embodiment of the disclosure.

FIG. 4 depicts a mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
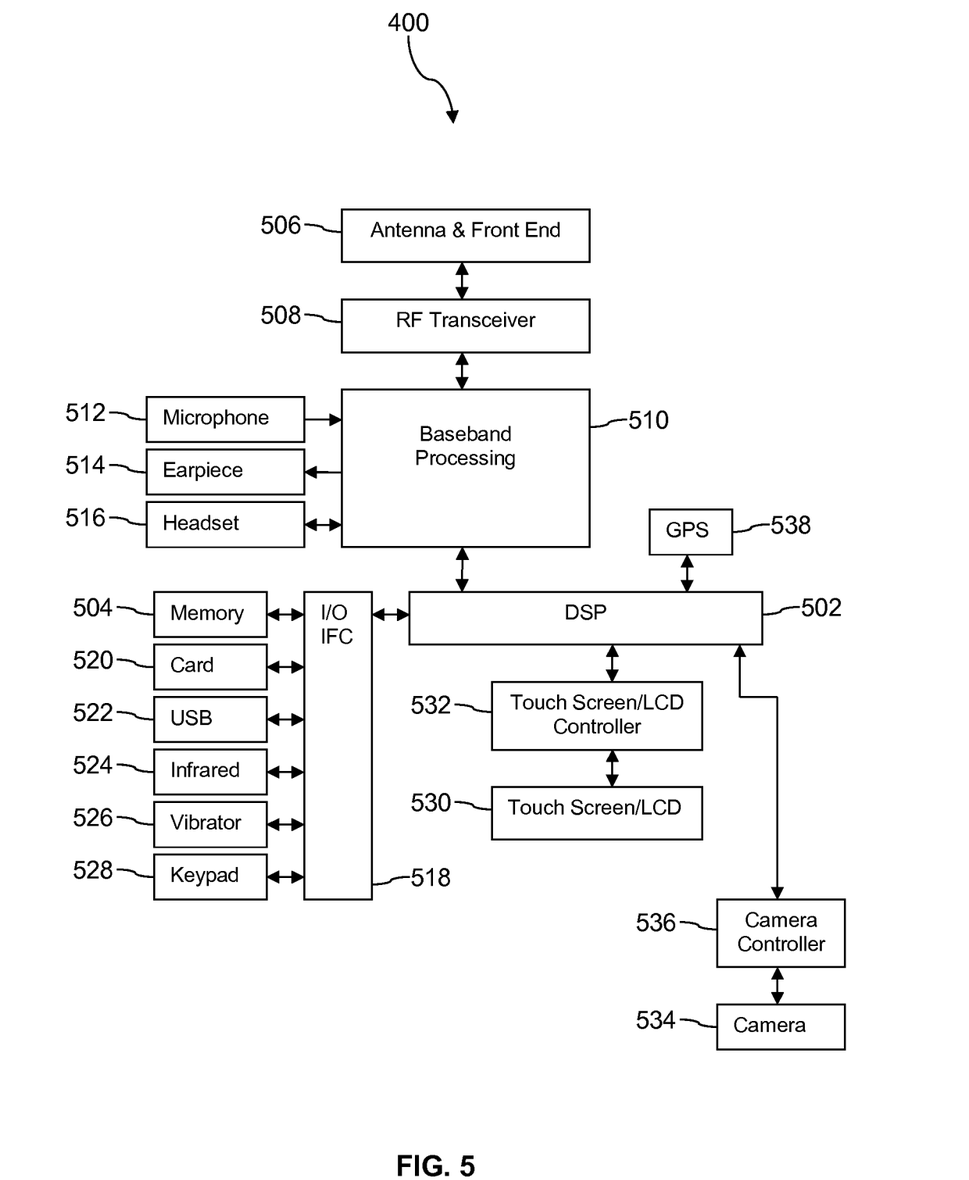
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
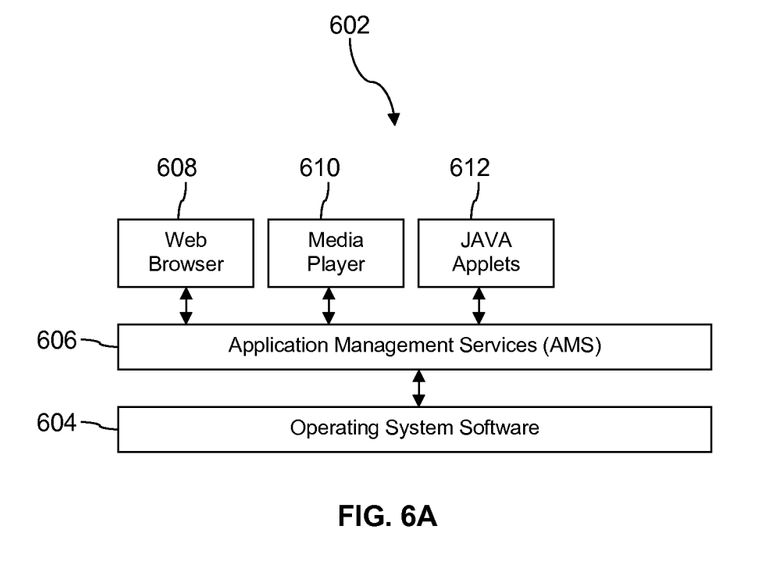
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
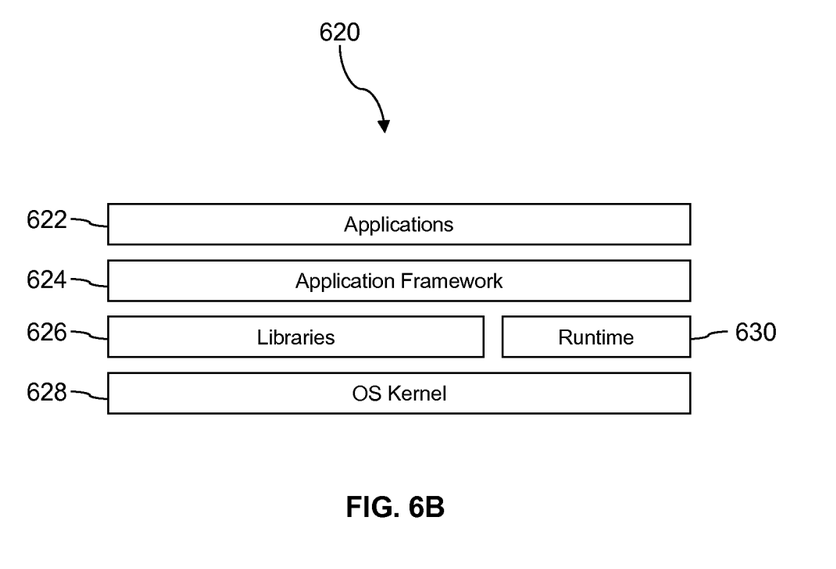
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
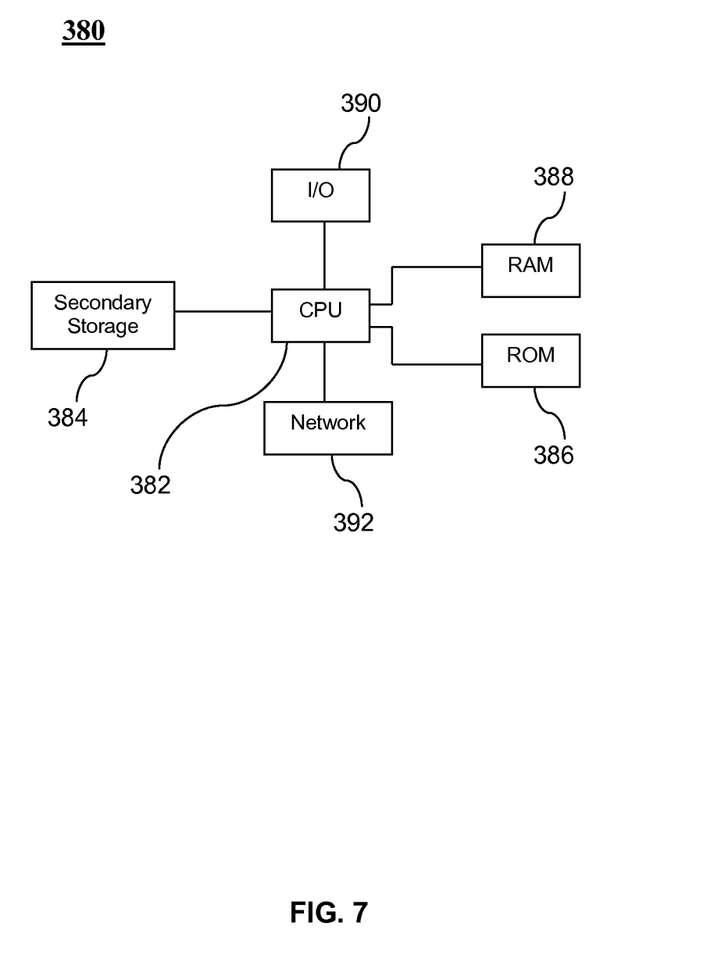
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An apparatus for improving the safety of a driver while driving a car, the apparatus comprising;
   a headset for combining an unobstructed view with a virtual overlay, the virtual overlay created from a virtual output provided to the headset, the virtual output having one or more portions;
   a memory;
   a processor;
   at least one input device coupled to the memory and capable of delivering input device data to the memory;
   an application stored in the memory that when executed by the processor determines characteristics of the driver or an environment around the driver based upon the input device data from the at least one input device, wherein the characteristics of the driver and the environment around the driver comprise at least one of: ambient light or position and direction of the eyes of a wearer of the headset, and at least one of: location and position of the car, motion of the car, relative position of the wearer of the headset within the car, or volume and relative speed of traffic around the car; and
   a controller program that:
     activates controlling features in response to a determination that at least one of: the wearer of the headset is in a driver's seat of the car, the car is in motion, or the car is running, and
     in response to the activation of the controlling features and based on the determined characteristics, at least one of: blocks a portion of the virtual output to the virtual overlay, alters at least a portion of the virtual output to the virtual overlay, or adds a new portion to the virtual output.

2. The apparatus of claim 1, wherein the at least one input device comprises at least one of: a camera, an accelerometer, a directional sensor, a microphone, a GPS, or a connection to a computer system of the car.

3. The apparatus of claim 1, wherein the blocking is based on an approved list of allowable virtual outputs for the determined characteristics.

4. The apparatus of claim 1, wherein the virtual overlay occludes no more than a predefined percentage of the wearer's field of vision.

5. The apparatus of claim 1, wherein a brightness of the virtual overlay is controlled based on the input device data.

6. The apparatus of claim 1, wherein at least a portion of the input device data comprises at least one of current federal, state, county, or city regulations.

7. An apparatus comprising a headset for combining an unobstructed view with a virtual overlay occluding a portion of the view, the apparatus comprising:
 a car on/off software component that uses inputs to determine whether a car is running, the car comprising a driver's seat;
 a wearer's position software component that uses inputs to determine whether a person wearing the headset is sitting in the driver's seat; and
 a controller program component that:
  at least one of analyzes all active programs providing inputs to the virtual overlay or analyzes the inputs to the virtual overlay and allows, alters, or adds a virtual output to the headset to be shown on the virtual overlay,
  activates controlling features in response to a determination by the car on/off software component that the car is running and a determination by the wearer's position software component that the person is wearing the headset and sitting in the driver's seat, and
  in response to activation of the controlling features, controls the virtual output by at least one of: blocking at least a portion of the virtual output to the virtual overlay, altering at least a portion of the virtual output to the virtual overlay, or adding a new portion to the virtual output.

8. The apparatus of claim 7, wherein the controller program controls the virtual output by comparing the active programs attempting to provide the virtual output to the headset to a list of allowable virtual outputs before their output will be shown on the headset.

9. The apparatus of claim 7, wherein the controller program controls the virtual output by reducing a percentage of visual area used by the virtual overlay.

10. The apparatus of claim 7, wherein the controller program controls the virtual output by altering a brightness of the virtual output displayed in the virtual overlay.

11. The apparatus of claim 7, wherein the controller program controls the virtual output by altering a transparency of the virtual output displayed in the virtual overlay.

12. The apparatus of claim 7, wherein the controller program controls the virtual output by limiting the virtual output displayed to certain locations on the virtual overlay.

13. The apparatus of claim 7, wherein the controller program comprises potentially required output for a driver based on an age of the driver.

14. An apparatus for improving the safety of a driver while driving a car, the apparatus comprising;
 a windshield for the car, the windshield capable of combining an unobstructed view with a virtual overlay occluding a portion of the view, the virtual overlay created from a virtual output provided to the windshield, the virtual output having one or more portions;
 a memory;
 a processor;
 at least one input device coupled to the memory and capable of delivering input device data to the memory;
 an application stored in the memory that when executed by the processor determines characteristics of at least one of the driver or an environment around the driver based upon the input device data from the at least one input device, wherein the characteristics of the driver and the environment around the driver comprise at least one of: ambient light or position and direction of the eyes of a wearer of the headset, and at least one of: location and position of the car, motion of the car, relative position of the wearer of the headset within the car, or volume and relative speed of traffic around the car; and
 a controller program that:
  activates controlling features in response to a determination that at least one of: the wearer of the headset is in a driver's seat of the car, the car is in motion, or the car is running, and
  in response to the activation of the controlling features and based on the determined characteristics, at least one of: blocks at least a portion of the virtual output to the virtual overlay on the windshield, alters at least a portion of the virtual output to the virtual overlay on the windshield, or adds a new portion to the virtual output provided to the windshield.

15. The apparatus of claim 14, wherein the at least one input device comprises at least one of: a component of a smart phone or a component of the car.

16. The apparatus of claim 14, wherein the characteristics of the at least one of the driver or the environment around the driver comprise at least one of: ambient light, noise level, location and position of the car, motion of the car, position and direction of the eyes of the driver, or volume and relative speed of traffic around the car.

17. The apparatus of claim 14, wherein the at least the portion of the virtual output is blocked based on a list of allowable virtual outputs for the determined characteristics.

18. The apparatus of claim 14, wherein the virtual overlay is controlled based on the input device data to at least one of: limit the size and location of the virtual output to the wearer's field of vision, control a brightness of the virtual overlay, or control an amount of transparency of the virtual overlay.

19. The apparatus of claim 14, wherein the at least one input device comprises at least one of: a camera, an accelerometer, a directional sensor, a microphone, a GPS, or a connection operably between a computer system of the car and a smart phone.

\* \* \* \* \*